June 11, 1968    H. J. MOSSBERG    3,387,354
VALVE INSERTING DEVICE
Filed July 20, 1966
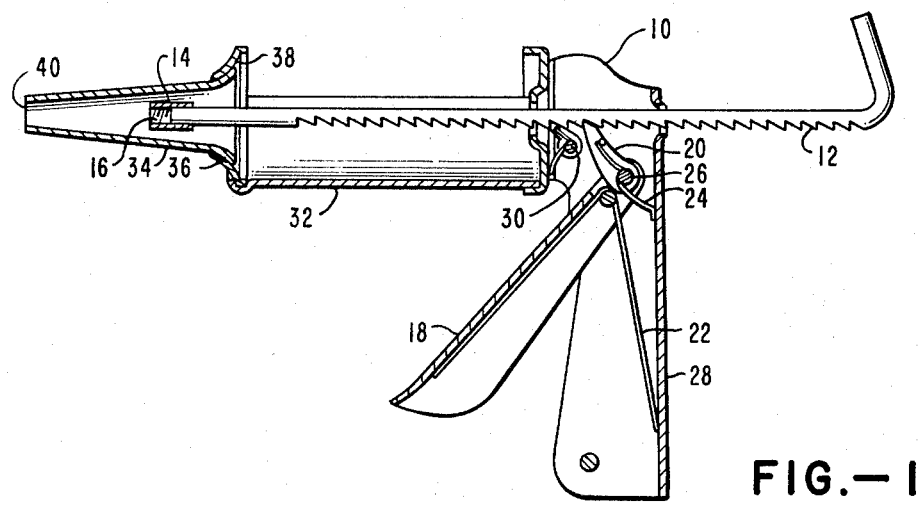
FIG.—1
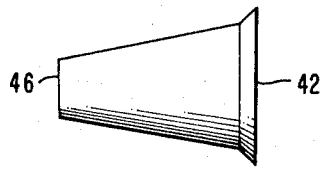
FIG.—2
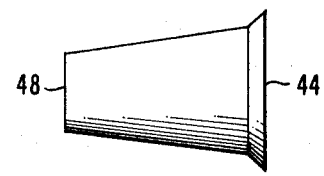
FIG.—3
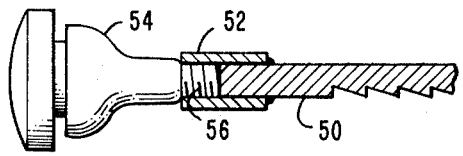
FIG.—4
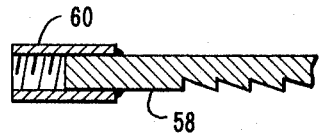
FIG.—5
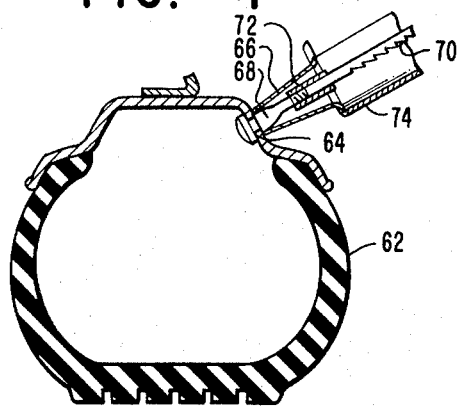
FIG.—6
*INVENTOR.*
HARRY J. MOSSBERG
BY *Sanford Astor*
ATTORNEY 3,387,354
VALVE INSERTING DEVICE
Harry J. Mossberg, 18215 Roscoe Blvd.,
Northridge, Calif. 91324
Filed July 20, 1966, Ser. No. 566,662
3 Claims. (Cl. 29—221.5)

ABSTRACT OF THE DISCLOSURE

The invention relates to a hand-held tool which will insert a valve stem into a tubeless tire from the outside. The tool engages the threaded end of the stem and by a notched-trigger advance system forces the stem into the stem hole in the tire.

---

This invention relates to a device for the insertion of a valve stem into a tire. More particularly this invention relates to a hand-held tool which will insert a valve stem into a tubeless tire without the need for removing the tire from the rim. In addition this invention relates to the method of inserting a valve stem into a tubeless tire.

The valve stem of a tubeless tire is a source of constant problem and difficulty. They are subject to cracking and splitting and often need replacement. However, the only method presently known to replace the valve is to remove the tire from the wheel and rim and pull the new valve through from the inside to the outside of the tire. This process is time consuming and troublesome.

As a result service station operators will often not even tell customers of the need for a new valve because they cannot be adequately compensated for the time they must take to replace it. Often if they do notify the car owner he will not wish to take the time to have the station attendant change the valve. Thus dangerous situations are created.

It is an object of the present invention to provide a device by which a valve stem may be inserted into a tubeless tire from the outside.

It is a further object of this invention to provide a method whereby a tubeless tire valve stem may be inserted into a tire without removing it from the rim.

It is a further object of the invention to provide a method for quickly and easily inserting a valve stem into a tubeless tire.

Still a further object of this invention is to provide a unitary hand held tool which is adapted to insert a valve stem into a tubeless tire while the tire is still on the rim.

These and other objects of this invention will be obvious from the following description together with the drawings in which:

FIG. 1 is a cross-sectional view of the device of the present invention.

FIG. 2 is a side elevation of the spout portion of the device.

FIG. 3 is a side elevation of another spout portion of the device.

FIG. 4 is a partial cross-section.

FIG. 5 is a partial cross-section of the retainer cap portion of the device, and FIG. 6 is a cross sectional view showing the method of inserting the valve stem into the tire.

Referring now to the drawings, there is shown in FIG. 1 a "gun" shaped unitary hand-held device 10 whose major moving part consists of a notched pusher rod 12 having a retainer cap 14 fixedly attached to the end thereof.

The retainer cap 14 has a sufficient threaded inside diameter 16 so that the valve end of a tire valve stem can be threadably engaged into the end of retainer cap 14 to hold the valve stem firmly during insertion. While a threaded retainer cap inside diameter is preferred for best results in tightly holding the valve stem, the device will operate satisfactorily if the inside diameter is not threaded but simply fits tightly over the valve stem and holds it by a friction fitting, shown more specifically in FIG. 4.

Pusher rod 12 is advanced forward by action of the trigger handle 18 and pivot advance 20 against a notch in pusher rod 12. Trigger string 22 returns the trigger handle 18 to the open position and pivot spring 24 activates pivot advance 20 to keep it engaged with a notch of pusher rod 12 as pivot advance 20 rotates on pivot advance shaft 26. Trigger spring 22 rests against handle 28 stressing trigger handle 18 to the open position. Keeper pivot 30 prevents the backwards movement of pusher rod 12.

While a well known notch advance system has been shown in the device of FIG. 1 for forward movement of the pusher rod 12, and this system is preferred due to its simplicity of operation and low cost of manufacture, other advance systems may be employed which will also be effective in moving the pusher rod forward for insertion of the valve stem. These systems may include a gear system or a pneumatic system or an automatic battery operated advance system.

The frame of the device consists of the handle 28 and barrel 32, which has open sides (not shown) for easy insertion of the valve stem and the spout 34. Spout 34 tapers from the barrel end 36 which fits flush but loosely inside the open end 38 of barrel 32, to the size at the insertion end 40 of the valve stem hole in the tire rim.

The insertion end 40 is inserted into the valve stem hole in the tire flush to the inside of the tire rim and the valve stem is forced forward by pusher rod 12 into the valve stem hole.

A great advantage gained by the design of this device is that the spout 34 can be easily replaced, since it is loose fitting and may be replaced with a spout of another size necessary to fit various sizes of valve stems.

FIG. 2 and FIG. 3 show spouts 42 and 44 respectively which are of different sizes at the insertion ends 46 and 48. In order to operate effectively the insertion end of the spout must be of a size equal to the size of the valve stem hole in the tire rim. The device is effective even though the spout is loose fitting because the friction and forward pressure of the valve stem against the inside surface of the spout when the stem is being forced forward into the valve stem hole is sufficient to keep the spout flush against the open end of the barrel.

FIG. 4 shows the end of a pusher rod 50 with retainer cap 52 into which is inserted a valve stem 54 at the valve end 56, as a friction fitting.

FIG. 5 shows a pusher rod 58 with a retainer cap 60 which has a threaded inside diameter so that the valve may be threadably attached to the retainer cap. After insertion of the valve stem the device is removed from the valve by simply unscrewing the retainer cap from the valve stem.

FIG. 6 shows the method by which a valve stem is inserted into the tire using the device of the present invention. Shown is a tire body 62 having a valve stem hole 64. Pressed into the valve stem hole 64 flush to the tire rim (not shown) is a spout 66 through which a valve stem 68 is being advanced by a pusher rod 70. The valve stem is held by retainer cap 72. Spout 66 is flush to the end of barrel 74.

The advance of pusher rod 70 forces the valve stem 68 into the tire 62 while the tire is still on the rim.

The device and method of the present invention have proved to provide a method for quick insertion, less than one minute has been required in actual operation, of a valve stem into a tubeless tire body without taking the tire from the rim.

Before insertion of the valve into the spout a rubber lubricant may be applied to the base portion of the valve stem and this procedure is desired to provide easier insertion. Any standard brand of rubber lubricant may be used.

Removal of the old valve stem from the tire is accomplished with a standard tire tool that slips over the threaded valve and the valve stem is pulled out by manual force.

Although a preferred embodiment of the invention has been described and illustrated by way of example, various modifications of the described embodiments may be made by those skilled in the art without departing from the scope of the invention as defined by the appended claims.

I claim:

1. A unitary hand-held device for inserting a valve stem into a valve stem receiving aperture of a tire rim from the outside thereof comprising:
   (a) a rotatable, notched pusher rod advanced by a trigger,
   (b) said rod having a threaded end cap to engage the threaded end of said valve to be inserted,
   (c) a tapered spout having an interior surface tapering of substantially the same size as said aperture operably associated with said notched pusher rod for positioning said valve stem.

2. The device of claim 1 in which said notched pusher rod is contained within a barrel having a forward open end.

3. The device of claim 2 in which said spout fits loosely, flush with said open end of said barrel.

References Cited

UNITED STATES PATENTS

| | | | |
|---|---|---|---|
| 626,582 | 6/1899 | Whisler | 29—221.5 |
| 2,438,642 | 3/1948 | Martin | 29—235 |
| 2,457,930 | 1/1949 | Smith | 29—235 |
| 3,144,707 | 8/1964 | Hiestand | 29—203 |
| 3,199,182 | 8/1965 | Harris et al. | 29—235 |
| 3,255,520 | 6/1966 | Jerdon | 29—221.5 |

OTHELL M. SIMPSON, *Primary Examiner.*

J. C. PETERS, *Assistant Examiner.*